United States Patent [19]

Hicks et al.

[11] Patent Number: 4,597,312

[45] Date of Patent: Jul. 1, 1986

[54] CONVERTIBLE AXLE

[75] Inventors: Bradford W. Hicks; Jeffrey O. Rolf, both of Mentor; Lewis J. Valentine, Lyndhurst, all of Ohio

[73] Assignee: Eaton Corporation, Cleveland, Ohio

[21] Appl. No.: 505,556

[22] Filed: Jun. 17, 1983

[51] Int. Cl.[4] ............... F16H 37/08; F16H 1/40; B21K 21/16; B23P 21/00

[52] U.S. Cl. ................. 74/695; 74/710; 74/713; 29/401.1; 29/469

[58] Field of Search ........... 74/695, 713, 710.5, 74/710, 740; 29/401.1, 469

[56] References Cited

U.S. PATENT DOCUMENTS

| | | | |
|---|---|---|---|
| 2,754,692 | 7/1956 | Russell | 74/473 |
| 2,947,200 | 8/1960 | Stump | 74/695 |
| 3,195,371 | 7/1965 | Christie | 74/695 |
| 3,265,173 | 8/1966 | Russell | 192/67 |
| 3,413,873 | 12/1968 | Bixby | 74/695 |
| 3,503,280 | 3/1970 | Bopp | 74/695 |
| 3,838,751 | 10/1974 | Brown | 184/6.12 |
| 4,095,675 | 6/1978 | Bell | 74/695 X |

*Primary Examiner*—William F. Pate, III
*Assistant Examiner*—Stephen B. Andrews
*Attorney, Agent, or Firm*—C. H. Grace; H. D. Gordon

[57] ABSTRACT

A convertible single speed single reduction drive axle (200) convertible to a shiftable two speed planetary double reduction drive axle (10) is provided. The convertible drive axle (200) utilizes a locking gear (204) and locking gear pins (206) with the same components as found in a two speed double reduction axle (10) with the exception of several components such as the sliding clutch gear (94), idler pinion gears (84), high speed clutch plate (90), clutch plate dowel pins (92), idler pinion pins (88), shift fork (112) and thrust washer (126), which are not utilized.

3 Claims, 5 Drawing Figures

CONVERTIBLE AXLE

BACKGROUND OF THE INVENTION

1. Field of the Invention

The present invention relates to a drive axle and in particular to a relatively simple single speed single reduction drive axle which may be quickly converted into a shiftable two speed drive axle or a planetary double reduction drive axle.

2. Description of the Prior Art

Single reduction drive axles for both relatively light duty vehicles such as passenger cars and for heavy duty vehicles such as trucks are well known in the prior art as may be seen by reference to U.S. Pat. No. 3,838,751 assigned to the assignee of this invention and hereby incorporated by reference.

Shiftable two speed drive axles of the planetary double reduction type and drive axles of the planetary double reduction type, usually utilized in heavy duty vehicles such as trucks, are also well known in the prior art. Examples of such drive axles may be seen by reference to U.S. Pat. Nos. 2,754,692; 3,195,371 and 3,265,173, all assigned to the assignee of this invention and all hereby incorporated by reference.

Single speed single reduction axles are highly advantageous in situations not requiring additional drive train ratios nor low, i.e. deep, reductions in view of their relative simplicity of construction, low cost and ease of operation.

Shiftable two speed axles of the planetary double reduction type and planetary double reduction axles are highly advantageous in situations requiring additional drive train ratios and/or relatively deep reductions. Such axles are widely commercially accepted, especially for vehicles utilizing simple rather than compound transmissions. Such axles, and the vehicles in which they are installed, in view of the great versatility of duty cycles for which they are suited, usually command a considerably higher resale value despite the higher cost, more complicated construction and requirement for greater operator skill and training relative to a single speed single reduction drive axle.

Accordingly, there has developed a demand for a single speed single reduction drive axle which can be quickly and easily converted into a shiftable two speed axle of the planetary double reduction type or into a single speed planetary double reduction type by that segment of the truck industry desiring the simplicity of operation and relative low cost of a single speed axle but preferring the increased resale value and/or the ability to change duty cycles of a two speed axle. The rental or lease truck fleet owners are an example of this segment of the truck market. The agricultural industry is an example of those purchasing used vehicles and requiring two speed axles.

SUMMARY OF THE INVENTION

In accordance with the present invention, the demands of the prior art are filled by the provision of a single speed single reduction drive axle which is easily and quickly converted into a shiftable two speed planetary double reduction or a single speed planetary double reduction drive axle.

The above is accomplished by providing a single speed single reduction drive axle which is structurally identical to a two speed planetary double reduction drive axle with several components, such as the sliding clutch gear, the high speed clutch plate, the idler gears, the idler pins, the clutch plate thrust washer, the clutch plate dowel pins and the shift fork assembly replaced by a special locking gear and locking gear pins. To convert the axle to a shiftable two speed axle, the locking gear and locking gear pins are removed and the above mentioned components installed in the usual manner. Accordingly, the conversion can be quickly and easily accomplished in the field by maintenance and repair shops.

Accordingly, an object of the present invention is to provide a new single speed single reduction drive axle which is easily and quickly convertible into a shiftable two speed axle of the planetary double reduction type or into a single speed planetary double reduction axle.

This and other objects and advantages of the present invention will become apparent from a reading of the detailed description of the present invention taken in connection with the attached drawings.

DESCRIPTION OF THE PREFERRED EMBODIMENT

Figure 1:
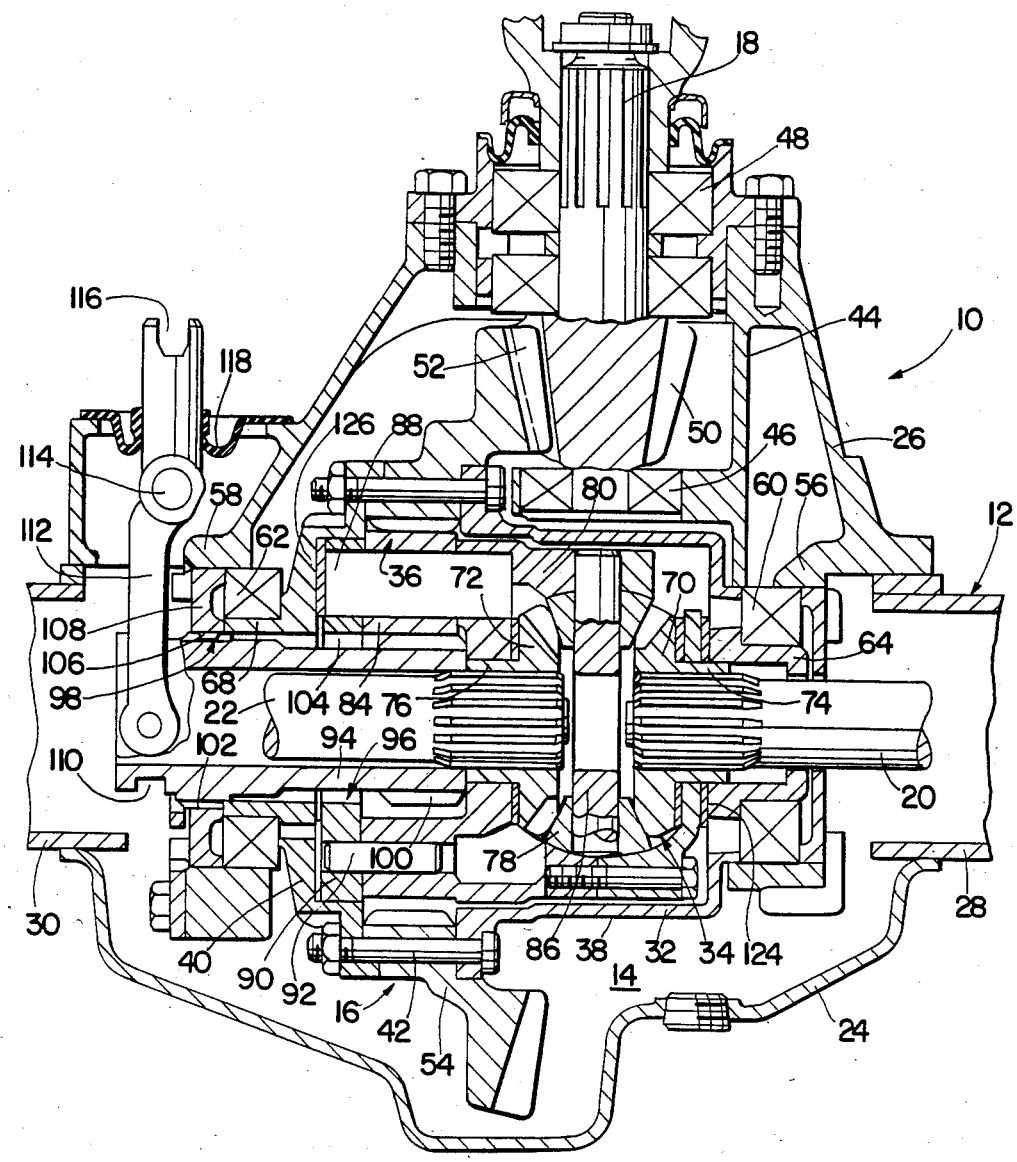
FIG. 1 is a plan view, in section, of the differential head assembly of a prior art two speed planetary double reduction drive axle.

Certain terminology will be used in the following description for convenience in reference only and will not be limiting. The words "upwardly," "downwardly," "rightwardly," and "leftwardly" will designate directions in the drawings to which reference is made. The words "inwardly" and "outwardly" will refer to directions toward and away from, respectively, the geometric center of the device and desingated parts thereof. Said terminology will include the words above specifically mentioned, derivatives thereof and words of similar import.

Figure 2:
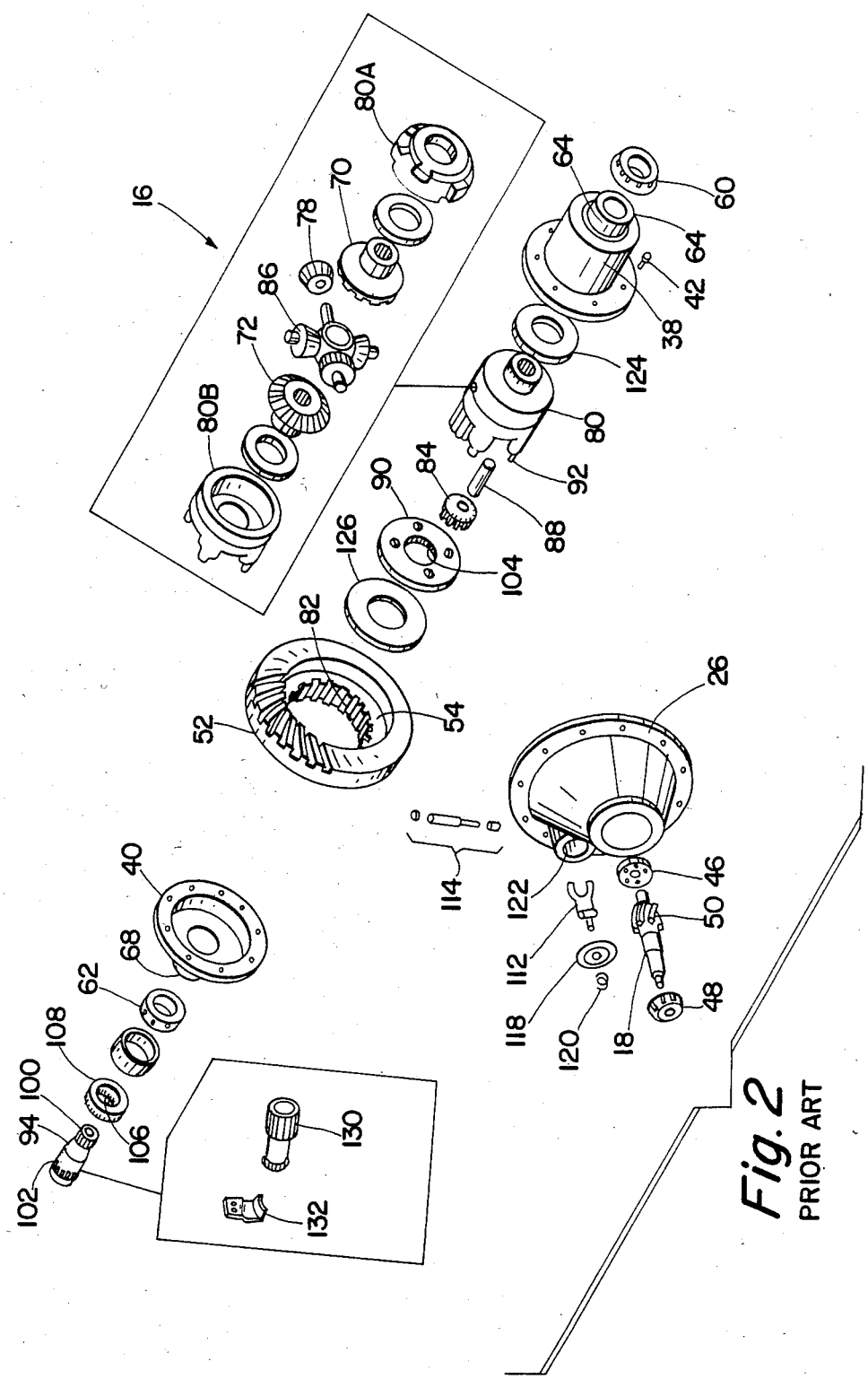
FIG. 2 is an exploded view of the prior art two speed axle of FIG. 1.

FIGS. 1 and 2 illustrate a change speed, two speed drive axle of the planetary double reduction type as illustrated in U.S. Pat. Nos. 2,754,692; 3,195,371 and 3,265,173, all assigned to the assignee of this invention and all hereby incorporated by reference.

The change speed axle mechanism 10 comprises an axle housing 12 containing a gear chamber 14 and a gear unit 16 located in such chamber. The axle mechanism 10 also comprises a rotatable power input means such as input shaft 18 operably connected with the gear unit 16, and power output axle shaft means connected with the gear unit and comprising latterally oppositely extending axle shafts 20 and 22 for supplying driving torque to a pair of traction wheels.

The housing 12 includes a rear cover member 24 and a front cover member 26 which are attached to the axle housing by means of studs, set screws or welding. The front cover 26 is also referred to as a differential carrier and supports the gearing unit 16. The housing 12 also includes tubular portions 28 and 30 extending in laterally opposite directions from the gear chamber 14 and in which the axle shafts are coaxially disposed.

The gear unit 16 comprises a rotatable gear case 32 located in chamber 14, and gearing comprising differential gearing 34 and change speed gearing 36 in the gear case in an associated relation. The differential gearing 34 and the change speed gearing 36 are both of the planetary type. The gear case 32 is formed by connected casing sections 38 and 40 secured together by suitable bolts 42 and of which the section 38 is the differential gear case section having the differential gearing 34 located therein and the section 40 is the change speed gear case section having the planetary gearing 36 located therein.

The front cover member 26 of the axle housing 12 includes a forwardly projecting bearing support portion 44 having a rear anti-friction bearing 46 and a pair of front anti-friction bearings 48 mounted therein. The bearings 46 and 48 rotatably support the power input shaft 18 and a power input drive member connected therewith, in this case, a bevel pinion gear 50. The gear unit 16 also includes a main gear, in this case, a bevel ring gear 52 in mesh with bevel pinion gear 50. It is understood, as is well known in the prior art, that pinion gear 50 and ring gear 52 may be of any well known gear tooth configuration such as spiral bevel gearing, hypoid gearing or the like. The ring gear 52 extends around the outside of gear case 32 and includes an annular connecting portion 54 which is clamped between the sections 38 and 40 of the gear case 32 by the bolts 42.

The cover member 44 also includes support ring portions 56 and 58 which extend into the gear chamber 14 and form bearing mounts for a anti-friction bearings 60 and 62 by which the gear unit 16 is rotatably supported in said chamber. The gear case 32 is provided with oppositely extending hollow support portions 64 and 68 which are received in the inner races of bearings 60 and 62.

The planetary differential gearing 34 comprises a pair of side gears 70 and 72 having sleeve portions 74 and 76 in which the inner portions of the axle shafts 20 and 22 are secured by splined connections, and planet pinion gears 78 in meshed engagement with the side gears and rotatably mounted on a planet pinion carrier 80. The planet pinion gears 78 operate to drive the side gears 70 and 72 for the delivery of torque to the traction wheels through the axle shafts in response to driven rotation of the carrier 80, and also operate to produce a differential action between the axle shafts in a manner well understood in the vehicle art when overrun of one or the other of the traction wheels occurs.

The planetary change speed gearing 36 comprises an internal ring gear 82 connected with the main ring gear 52, preferably in the form of internal gear teeth formed integrally therein, and planet pinion gears 84 in meshed engagement with the ring gear 82 and rotatably mounted on the carrier 80. The carrier 80, which is formed of two casing halves 80A and 80B, is thus common to the differential gearing 34 and the change speed gearing 36 inasmuch as both sets of planet pinion gears 78 and 84 are rotatably mounted thereon. The planet pinon gears 78 are here shown as being rotatably mounted on the carrier 80 by a spider member 86 having its outer ends received in portions of the carrier 80, and the planet pinion gears 84 are here shown as being rotatably mounted on the carrier 80 by axially extending pinion shafts 88. Pinion gears 84 are also known as idler pinions and pinion shafts 88 are also referred to as idler pinion pins.

The carrier 80 includes a hollow body portion in which the differential gearing 34 is located and a ring or plate 90 which is connected with the body section, as by dowel pins 92 or the like. Plate 90 is also referred to as the high speed clutch plate and pins 92 are also referred to as the high speed clutch plate pins. The carrier 80 is supported for rotation in the chamber of the gear case 38 by being journaled on the projection 74 of the side gear 70, and also by having the periphery of the annular plate 90 slidably mounted in a recess of the gear case section 40. The planet pinion shafts, or idler pinion pins, 88 having their ends mounted in the body of the plate 90 and carrier 80 and, in addition to forming pivot shafts for the planet pinion gears 84, they also serve to connect the carrier 80 and plate 90.

The gear unit 16 also includes a control sleeve, or sliding clutch gear, 94, located in surrounding relation to the axle shaft 22 and slidable along the latter. The sliding clutch gear 94 forms a reaction means for the planetary change speed gearing 36 and also defines a clutch part of a clutch device 96 as well as a part of a holding means 98. The clutch device 96 and holding means 98 will be further described hereinafter.

To enable the sliding clutch gear 94 to function as a reaction means for the planetary gearing 29 it is provided at the inner end thereof with external sun gear teeth 100 which are continuously in mesh with the planet pinion, or idler, gears 84. The sliding clutch gear 94 is also provided with an annular group of external teeth 102 which form a part of the holding means 98.

The first clutch device 96 is formed in part by the sun gear teeth 100 and in part by a annular array of internal teeth 104 formed on high speed clutch plate 90. The holding means 98 is formed in part by the teeth 102 of the sliding clutch gear 94, as mentioned above, and in part by an annular group of stationary internal teeth 106 provided on the axle housing 12, the teeth 106 being in this case formed on a retaining member 108 for the anti-friction bearing 62.

As shown in the drawing, the annular groups of internal teeth 104 and 106 are located at axially spaced points on the axle mechanism, and the annular group of teeth 102 and sun gear teeth 100 are located at axially opposite ends of sliding clutch gear 94. The teeth 100 of the sun gear are located at the inner end portion of the sliding clutch gear 94 and are of a suitable axial length extending therealong for producing a coupling or a lock up action between the planet pinion gears 84 and the high speed clutch plate 104.

From the construction of the sliding gear 94 and the location thereof with respect to teeth 104 and 106, it will be seen that the sun gear teeth 100 and the teeth 104 constitute cooperable clutch members of the above mentioned first clutch device 96 and that the groups of teeth 102 and 106 form cooperably engageable holding members of the above mentioned holding device 98. It will be seen furthermore that the sun gear 100 forms a reaction gear in the planetary gearing 36 when the sliding clutch gear 94 has been shifted toward the right to a non-rotatable control setting in which the teeth 102 are in meshed engagement with the teeth 106. The sliding clutch gear 94 is shown in FIG. 1 in its reaction gear setting to which it has been shifted by movement toward the right for disengaging the sun gear teeth 100 from the clutch teeth 104 and engaging the teeth 102 with the holding teeth 106. This is the low speed double reduction setting of prior art axle 10. By shifting the sliding clutch gear 94 leftwardly, the teeth 102 will disengage the holding teeth 106 and the sun gear teeth 100 will engage the clutch teeth 104 thereby locking the idler pinion gears 84 to the high speed clutch plate 90 and allowing the sliding clutch gear 94 to rotate relative to the axle housing 12. In this position, the high speed single reduction position, the planetary gearing 36 is locked up and the ring gear 52, the planetary pinions 84 and the casing 80 will rotate as a unit.

To provide for such axial shifting of the sliding clutch gear sleeve 94 between its inner non-rotatable control setting and its outer rotatable control setting, an annular groove 110 formed in the sleeve adjacent its outer end has a shifter lever 112 engaged therein. The shifter lever 112 is pivotably supported on the axle housing 12 as by a pivot pin assembly 114. The outer end of the shifter lever, or shift fork, is provided with an attachment means, such as groove 116, for cooperation with a power shifting mechanism of the type well known in the prior art. A seal 118 and spring 120 are provided to seal the opening to housing 12 from which shift lever 112 protrudes. A plurality of fasteners, such as studs 122 are provided in front cover 26 for mounting the shifting actuator (not shown) to the cover 26.

A thrust washer 124 surrounds protrusion 74 of side gear 70 to act as a wear surface between case 38 and casing 80 and a thrust washer 126 is provided to act as a war surface between plate 90 and case 40.

From the construction of the vehicle drive axle mechanism 10 described above it may be seen that the prior art shiftable two speed axle mechanism drives its differential gearing 34 at different selectable speeds for producing high and low vehicle speeds, depending upon the control setting of the sliding clutch gear 94. When the sliding clutch gear 94 is shifted to the right to its non-rotatable position, the sliding clutch gear will be held against rotation by the engagement of teeth 102 and 106 and the sun gear 100 will then be a reaction gear for the planetary pinions 84 and the input power supplied to the ring gear 52 will rotate the gear case 32 causing the ring gear internal gear teeth 82 to produce a rolling action of the planetary pinions 84. The planetary pinions rotate about the radially fixed sun gear and transmit the rotary motion to the casing 80 through idler pinions 88. This causes the rotation of the differential 34 and axle shafts 20 and 22. This is the low speed or planetary double reduction mode of operation of drive gear 10. In this mode of operation the first gear reduction occurs between the pinion 50 and ring gear 52 and the second gear reduction is the planetary gear reduction of the planetary gearing 36.

When the sliding clutch gear 94 is shifted to the left, the teeth 102 disengage from the stationary teeth 106 and the sliding clutch gear 94 is free to rotate relative to housing 12. The sun gear teeth 100 will engage both the planetary pinions 84 and the clutch teeth 104 of high speed clutch plate 90 to lock the planetary gearing and thus the gear case 32 will turn with ring gear 52. In this mode of operation, the high speed mode of operation a single reduction, namely the gear reduction between pinion 50 and 52 is achieved and the power supply from the input shaft 18 is subject to a single gear reduction to the differential gearing 34.

In certain situations, it was desired that the prior art drive axles of the type illustrated in FIGS. 1 and 2 be locked in the low speed or planetary double reduction mode of operation. As may be seen by reference to FIG. 2 in such situations a modified sliding clutch gear 130 and a locking member 132 were provided to replace the sliding clutch gear 94 and shifting mechanism of the two speed drive axle. Locking mechanism 132 locks the modified sliding clutch gear 130 in its rightward most position (as seen in FIG. 1) to provide a permanent planetary double reduction operation of axle 10. Such axles are referred to as planetary double reduction axles or single speed planetary double reduction axles.

Shiftable two speed axles of the type illustrated in FIGS. 1 and 2, or of the planetary double reduction type, are highly advantageous in situations requiring additional drive train ratios and/or relatively deep reductions. Such axles are widely commercially accepted and vehicles incorporating same tend to have higher resale value, especially for resale to the agricultural markets. Such axles however are more complicated and expensive to manufacture, purchase and maintain and require a considerably higher level of operator skill relative to single speed drive axles. For those desiring the relative lower cost and operating simplicity of a single speed drive axle yet desiring the relatively higher resale value of a two speed drive axle there has developed a demand for a single speed single reduction drive axle which can be quickly and easily converted into a shiftable two speed axle of the planetary double reduction type.

As used herein, the term "two-speed double reduction drive axle" will include drive axles of the single speed planetary double reduction type.

Figure 3:
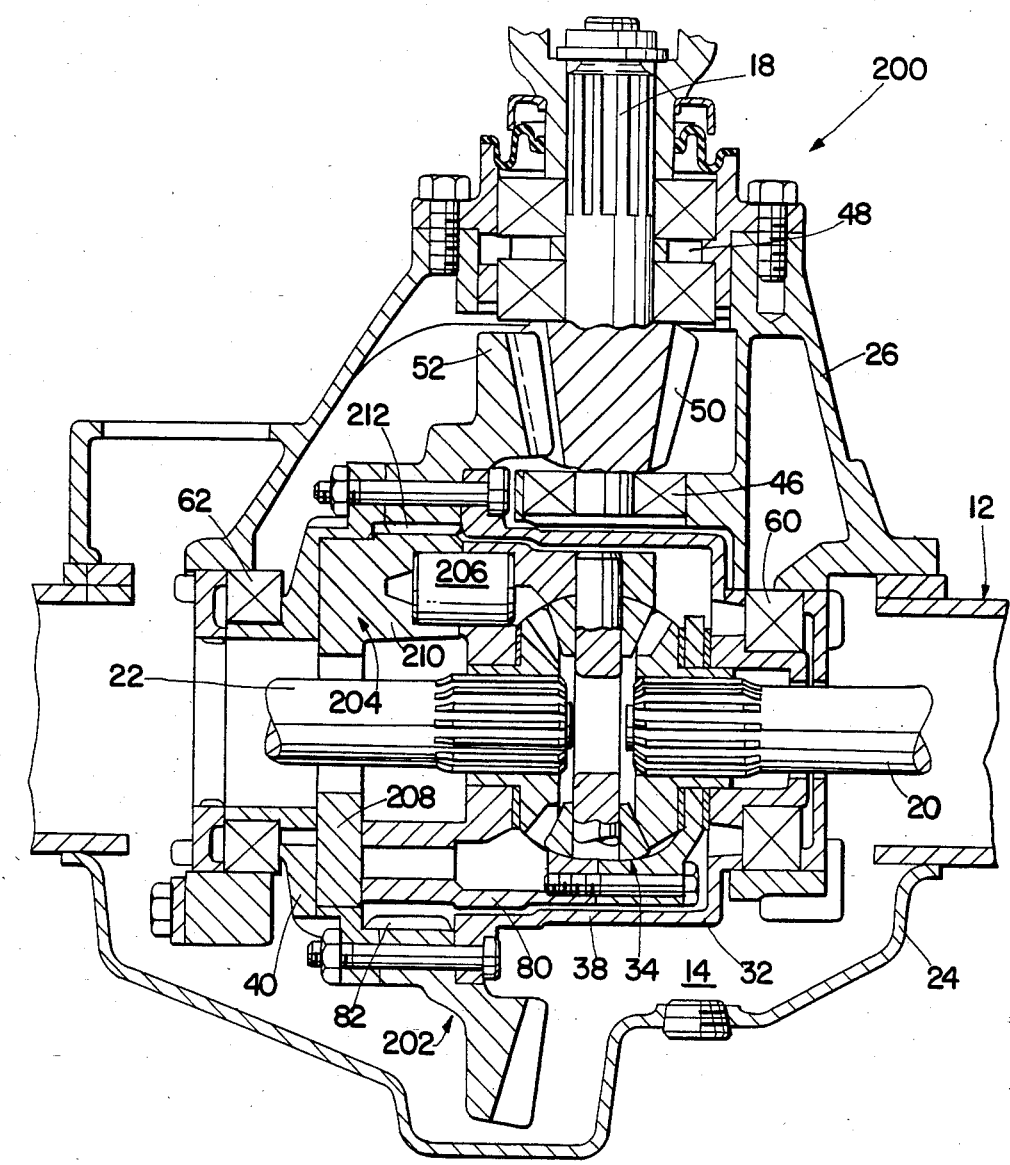
FIG. 3 is a plan view, in section, of the differential head assembly of the convertible single speed single reduction drive axle of the present invention.
Figure 4:
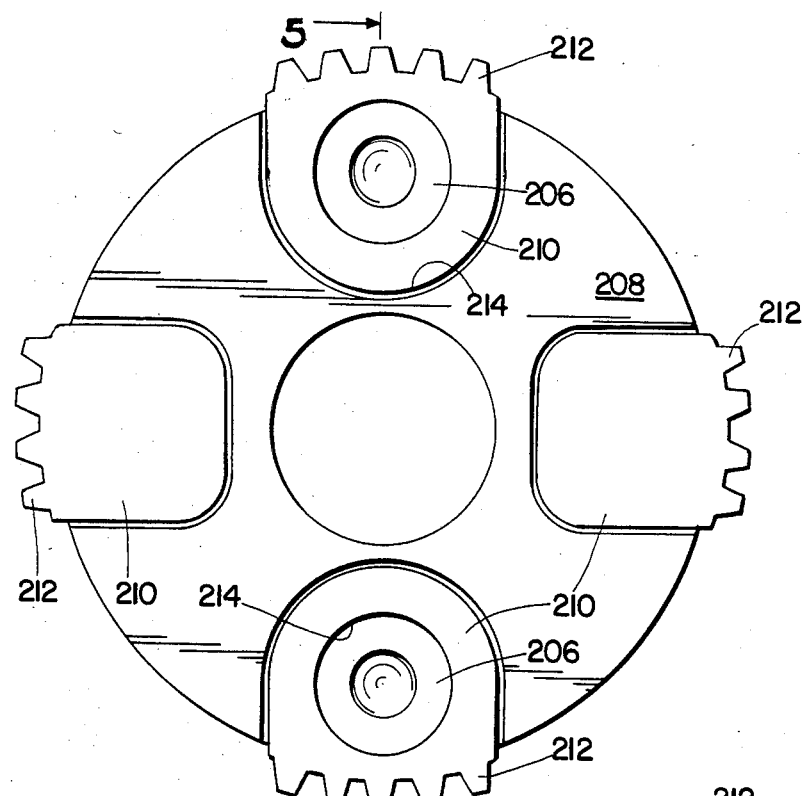
FIG. 4 is a front view of the locking gear member of the present invention.
Figure 5:
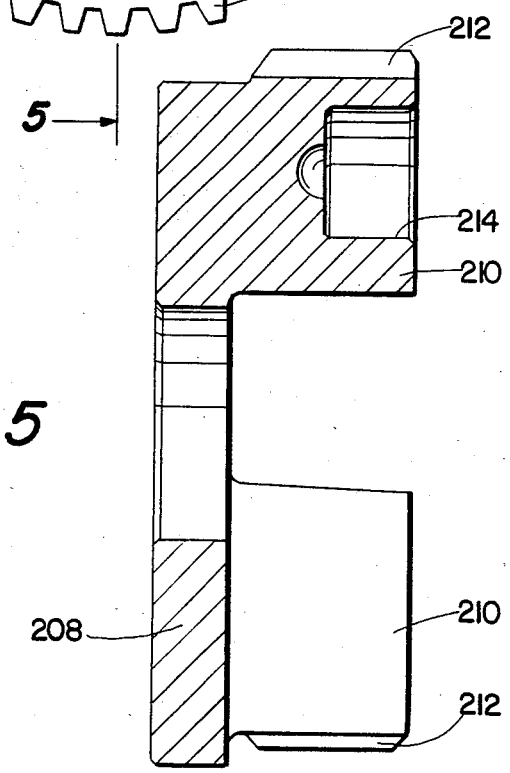
FIG. 5 is a side view of the locking gear member of the present invention.

The convertible axle 200 of the present invention may be seen by reference to FIGS. 3, 4 and 5, and comprises a single speed single reduction drive axle which may be quickly and easily converted into a shiftable two speed planetary double reduction drive axle. Components and/or elements of convertivle drive axle 200 which are structurally and funtionally identical, or substantially identical, to elements and components of prior art axle 10 described above will be assigned like reference numerals.

Referring to FIG. 3, convertible drive axle 200 comprises an axle housing 12 containing a gear chamber 14 and a convertible gear unit 202 located in such chamber. The convertible axle mechanism 200 also comprises a rotatable power input means such as input shaft 18 connected with the gear unit 202 and a power output axle shaft means connected with the gear unit 202 and comprising laterally oppositely extending axle shafts 20 and 22 for supplying driving torque to the traction wheels. The housing 12 also includes a rear cover member 24 and a front cover member, or carrier member 26.

The convertible gear unit 202 also comprises a rotatable gear case 32 located in chamber 14, differential gearing 34 and a main ring gear 52 in mesh with pinion gear 50, all of which are identical to the like elements described above in connection with two speed drive axle 10. The convertible drive axle 200 also includes bearings 46, 48, 60 and 62, all of which are identical to the like bearings described above in connection with prior art drive axle 10. Case 32 comprises case portions 38 and 40. The differential gearing 34 is located within a case or carrier 80 which is identical to the case 80 utilized in connection with prior art axle 10 described above. An annular set of interior ring gear teeth 82 are provided on ring gear 52.

Located within rotatable gear case 32 is a locking gear structure and a pair of locking gear pins which replace the sliding clutch gear, idler pinion gears, high speed clutch plate, high speed clutch plate pins, idler pinion pins, shift fork 112, shift fork pivot pin, dowel pins, thrust washer 126 and shift fork seal utilized in the prior art two speed drive axle 10 described above. The structure of locking gear 204 may be seen in greater detail by reference to FIGS. 4 and 5.

Locking gear 204 includes an annular base portion 208 conforming closely in shape to the high speed clutch plate 90 of the prior art, and a plurality of axially rightwardly extending portions 210, preferably at least four, which carry external teeth 212 for locking engagement with internal clutch teeth 82 on the ring gear 52. Portions 210 are of an axial length and outer diameter substantially equal to the axial length and outer diameter of the idler pinions 84 when same are rotatably carried by the casing 80 in the prior axle 10 described above. Two of the axially extending portions 210 are provided with bores 214 in which are received the locking gear pins or dowels 206. The pins 206 are of the same outer diameter as the idler pinion pins 88 of the prior art two speed axle 10 for receipt within casing 80 and serve to lock the locking gear 204 to the casing 80 for rotation therewith.

Accordingly, in the convertible axle 200, torque is transferred from the pinion 50 to the ring gear 52, from the ring gear 52 to the locking gear 204 by means of the engaged teeth 82 on the ring gear 52 and exterior teeth 212 on the locking gear 204, from the locking gear 204 to the carrier 80 by means of locking gear pins 206 and from the casing 80 through the differential gearing to the axle shafts 20 and 22 in the known prior art manner. Accordingly, axle 200 operates as a single speed single reduction axle in much the same manner as single speed single reduction axles of the prior art as seen in U.S. Pat. No. 3,838,751 assigned to the assignee of this invention and hereby incorporated by reference and in much the same manner as the prior art two speed axle 10 described above when same is in its high speed, single reduction mode of operation.

To convert the convertible axle 200 to a two speed planetary double reduction axle such as the axle 10 described above, the locking gear 204 and locking gear pins 206 are removed and reflaced by a sliding clutch gear 94, idler pinions 84, high speed clutch plate thrust washer 126, high speed clutch plate 90, high speed clutch plate dowel pins 92, idler pinion pins 88, shift fork 112, shift fork pivot pin 114, shift fork seal 118, and seal spring 120, all of which can be simply and easily replaced by mechanics familiar with servicing the two speed planetary double reduction drive axles of the prior art.

Accordingly, a convertible single speed single reduction drive axle 200 has been provided which is relatively simple to operate, which is relatively less complicated and less expensive to manufacture and purchase than a two speed planetary double reduction drive axle but which may be simply and easily converted into a two speed double reduction drive axle.

While the above invention has been described in its preferred embodiment with a certain degree of particularity, it is understood that the description of the preferred embodiment is by way of example only and that numerous changes in the structure and arrangement of the parts may be resorted to without departing from the spirit and the scope of the invention as hereinafter claimed.

We claim:

1. A convertible drive axle convertible into and from a first two speed planetary double reduction drive axle embodiment from and into, respectively, a second single speed single reduction drive axle embodiment;

said first embodiment comprising a housing, an input gear driving a ring gear which carries an annular ring of internal gear teeth, a differential gear carrier carrying differential gearing adapted to drive a pair of axle shafts, a plurality of pinion gear pins fixed to the differential carrier and to a high speed clutch plate at opposite ends thereof, said high speed clutch plate fixed to said differential gear carrier, a pinion gear rotatably supported on each pinion gear pin and constantly meshed with said annular ring of internal teeth, a slidable sleeve carrying sun gear teeth constantly meshed with said pinion gears, said sun gear having a first axial position for locking said sun rotationally to said housing and second axial position allowing said sleeve to rotate relative to said housing and rotationally fixing said pinion gear to said ring gear and means for selectively axially shifting said slidable sleeve;

said second embodiment comprising a locking gear and a plurality of locking gear pins utilized interchangeably in place of said pinion gear pins, pinion gears, high speed clutch plate, slidable sleeve and means for selectively axially shifting said slidable sleeve, said locking gear comprising an annular base member having substantially the same outer diameter and axial thickness as said high speed clutch plate and a plurality of boss members extending axially from said base member and carrying external clutch teeth thereon, said external clutch teeth engagable with said annular ring of internal gear teeth to rotationally fix said locking gear to said ring gear, a plurality of said boss members provided with a bore opening to the end thereof, said bore having an inner diameter slightly greater than the outer diameter of said pinion gear pins, said locking gear pins having substantially the same outer diameter as said pinion gear pins and received in said bores and said differential carrier at opposite ends thereof.

2. The convertible drive axle of claim 1 wherein said external teeth carried by said locking gear are of substantially the same axial length and located at the same radial distance from the axis of rotation of said axle shafts as the teeth of the idler pinion gears of the first embodiment.

3. The convertible drive axle of claim 2 wherein said pinion gear pins and said locking gear pins are received in bores provided in said differential gearing carrier.

* * * * *